United States Patent [19]

Kamir

[11] Patent Number: 5,221,997
[45] Date of Patent: Jun. 22, 1993

[54] ASSEMBLY OF PRECISELY ADJUSTABLE LINEARLY-ARRANGED ELEMENTS, PARTICULARLY LENSES

[75] Inventor: Yossi Kamir, Netanya, Israel

[73] Assignee: Scitex Corporation, Herzlia, Israel

[21] Appl. No.: 858,285

[22] Filed: Mar. 26, 1992

[30] Foreign Application Priority Data

May 2, 1991 [IL] Israel ............................ 98037

[51] Int. Cl.$^5$ .................... G02B 15/14; G02B 7/02
[52] U.S. Cl. .................... 359/694; 359/704; 359/823
[58] Field of Search ................ 359/811–822, 359/827, 896, 823–830, 900, 694, 695, 702–706; 411/8, 87, 63

[56] References Cited

U.S. PATENT DOCUMENTS

| | | | |
|---|---|---|---|
| 3,752,569 | 8/1973 | Nelson et al. | 359/819 |
| 4,749,268 | 6/1988 | Moskovich et al. | 359/819 |
| 4,832,452 | 5/1989 | Eisler | 359/819 |

FOREIGN PATENT DOCUMENTS

| | | | |
|---|---|---|---|
| 48707 | 7/1987 | European Pat. Off. | 359/819 |
| 38704 | 3/1984 | Japan | 359/819 |
| 89916 | 4/1987 | Japan | 359/819 |

Primary Examiner—Rodney B. Bovernick
Assistant Examiner—Thong Nguyen
Attorney, Agent, or Firm—Benjamin J. Barish

[57] ABSTRACT

An assembly of a plurality of lens holders includes a housing formed with a cavity for slidably receiving the lens holders in alignment with each other. One lens holder is formed with a bore of a first diameter having internal threads at a smaller diameter portion thereof. The other lens holder is formed with a bore having internal threads of a diameter equal to that of the smaller diameter of the first lens holder. The outer face of the housing is formed with a bore in alignment with the bores of the two lens holders and has a diameter at least as large as that of the first diameter to permit an adjusting implement formed with external threads to be inserted via the aligned bores in the housing and the two lens holders to precisely adjust the two lens holders with respect to each other.

20 Claims, 2 Drawing Sheets

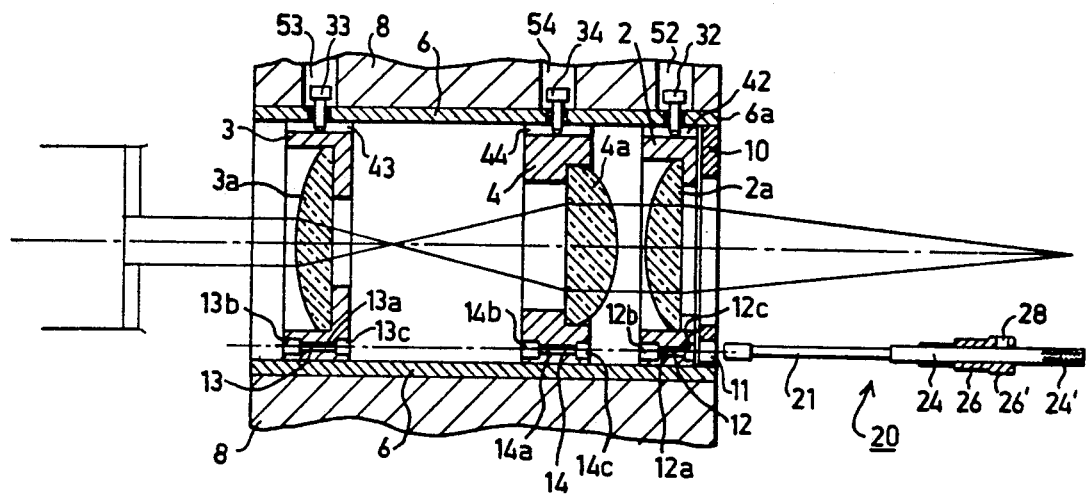
FIG. 2
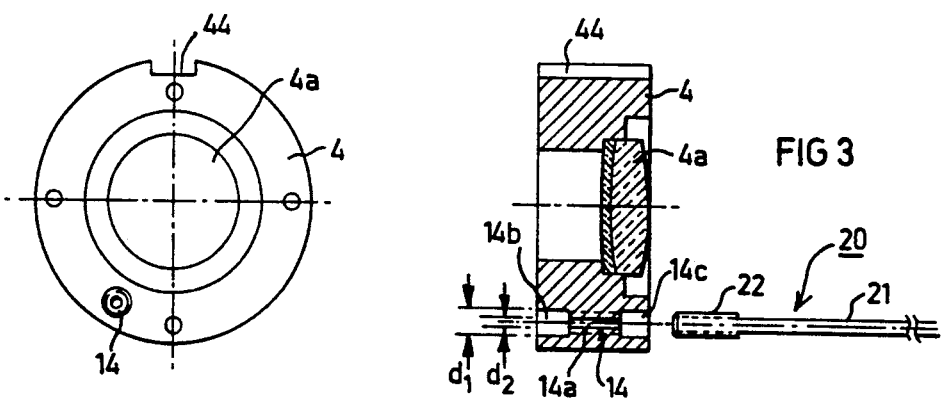
FIG 4
FIG 3

ASSEMBLY OF PRECISELY ADJUSTABLE LINEARLY-ARRANGED ELEMENTS, PARTICULARLY LENSES

FIELD AND BACKGROUND OF THE INVENTION

The present invention relates to assemblies of linearly arranged elements which are to be precisely adjusted with respect to each other. The invention is particularly useful in a lens assembly, and is therefore described below with respect to this application.

Many types of assemblies, and particularly lens assemblies, include a plurality of linearly-arranged elements which must be precisely positioned with respect to each other. The conventional way of accomplishing this is to provide a separate adjusting screw or the like for each element, but this usually requires the assembly to have a separate access location for each of the individual adjusting means. In some types of assemblies, particularly lens assemblies, this may not be possible or convenient.

OBJECTS AND BRIEF SUMMARY OF THE INVENTION

An object of the present invention is to provide an assembly of a plurality of linearly-arranged elements which permits each element to be individually adjusted from one access location of the assembly. Another object of the invention is to provide a lens assembly which may include two, three or more lenses, each of which may be individually adjusted from one access location at the outer face of the assembly.

According to the present invention, there is provided an assembly of a plurality of at least two linearly-arranged elements, comprising a housing formed with a cavity slidably receiving the elements in alignment with each other, with one of the elements being proximal and the other distal with respect to an outer face of the housing. The proximal element is formed with a throughgoing opening of a first transverse dimension having internal threads at a portion thereof of a second transverse dimension smaller than that of the first transverse dimension. The distal element is formed with an opening having internal threads of a transverse dimension equal to that of the second transverse dimension in alignment with the throughgoing opening of the proximal element. The outer face of the housing is formed with an opening in alignment with the openings of the proximal and distal elements and has a transverse dimension at least as large as that of the first dimension to permit an adjusting implement formed with external threads to be inserted via the aligned openings in the housing, proximal element and distal element, to precisely adjust the proximal and distal elements with respect to each other and with respect to the outer face of the housing by engaging the external threads of the adjusting implement first with the internal threads of the distal element, and then with those of the proximal element.

The openings in the housing and in the plurality of elements could be merely slots formed with internal threads for a portion thereof, e.g. for about one-half or more of the circumference of the slot. However, in accordance with further features in the preferred embodiment of the invention described below, such openings are throughgoing bores of circular cross-section. Each bore in each of the plurality of elements has a first section of one diameter, constituting the first transverse dimension mentioned above, and a second section a second diameter, constituting the second transverse dimension mentioned above. In addition, the internal threads of the plurality of elements are formed midway of their respective bores.

As indicated earlier, the above features of the invention are applicable to many different types of assemblies having a plurality of linearly-arranged elements to be precisely adjusted with respect to each other. The invention, however, is particularly useful with respect to lens assemblies, wherein the plurality of elements are lens holders each holding a lens to be precisely positioned within the housing.

Further features and advantages of the invention will be apparent from the description below.

BRIEF DESCRIPTION OF THE DRAWINGS

The invention is herein described, by way of example only, with reference to the accompanying drawings, wherein:

FIG. 2 is a longitudinal sectional view illustrating the lens assembly of FIG. 1 in assembled condition with the adjusting implement in position for adjusting the lens holders within the assembly;

FIG. 3 is an enlarged fragmentary view more particularly illustrating one type of lens holder that may be included in the assembly of FIGS. 1 and 2, and also the cooperable portion of the adjusting implement for adjusting the lens holders of that assembly;

and FIG. 4 is an end view illustrating the lens holder in FIG. 3.

DESCRIPTION OF A PREFERRED EMBODIMENT

Figure 1:
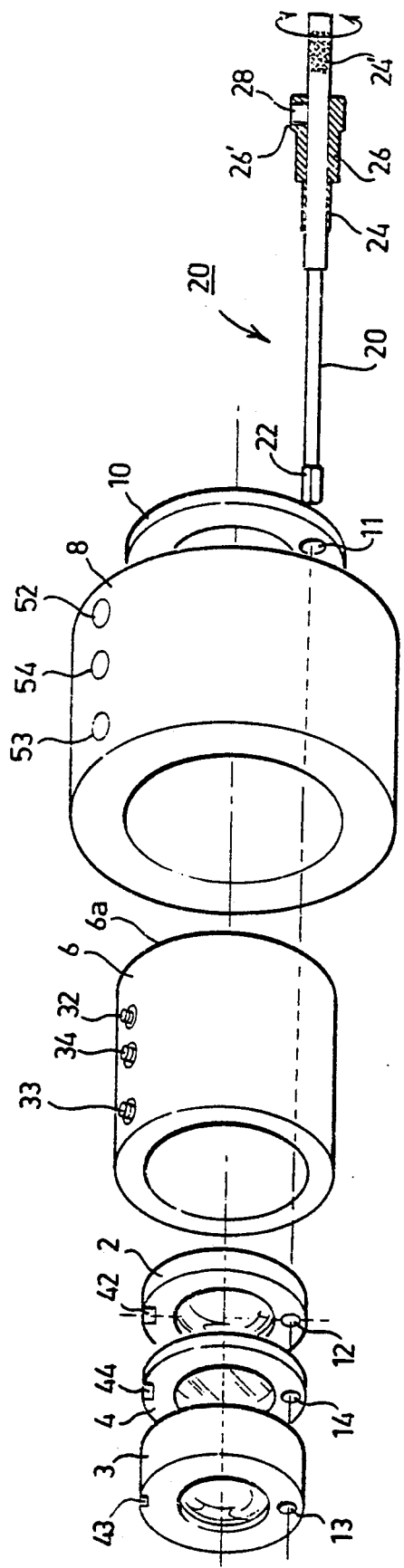
FIG. 1 is an exploded view illustrating one form of lens assembly constructed in accordance with the present invention including the adjusting implement to be used for adjusting the lenses within the assembly.

The assembly illustrated in the drawings is a lens assembly comprising three lens holders 2, 3 and 4, respectively, mounted within an inner cylindrical housing 6, which inner housing is mounted within an outer cylindrical housing 8. Each of the lens holders 2, 3, 4 holds a lens 2a, 3a, 4a to be precisely adjusted with respect to each other, and with respect to their inner housing 6. The inner housing 6 includes a retainer ring 10 at one end 6a, which end constitutes the outer face of the inner housing 6. Only this outer face 6a is conveniently accessible, or accessible at all, for adjusting the lens holders 2, 3, 4. Therefore, all adjustments of these lenses are made via the outer face 6a of the assembly.

The adjustments of lens holders 2, 3, 4 are made by an adjusting implement, generally designated 20.

In the lens assembly illustrated in the drawings, lens holder 2 is called the proximal lens holder since it is closest to the outer face of the assembly, namely that occupied by the outer retainer ring 10, through which the adjustments have to be made; and lens holder 3 at the opposite end of the assembly is called the distal lens holder since it is most distant from this outer face of the assembly. In the three-lens assembly illustrated in the drawings, the third lens holder 4 is designated an intermediate lens holder, since it is between the proximal lens holder 2 and the distal lens holder 3.

To permit individual adjustment of each lens holder 2, 3, 4, from the outer face of the assembly occupied by the retainer ring 10, the retainer ring 10 is formed with a bore 11, and each of the lens holders 2, 3, 4 is formed with a bore, 12, 13, 14 respectively, aligned with each other and with bore 11. The bores 12, 13, 14 are all of the same configuration, as more particularly illustrated in FIG. 3 illustrating the intermediate lens holder 4.

As shown in FIG. 3, bore 14 is of a diameter $d_1$ and is unthreaded for its complete length except for an intermediate portion 14a which is formed with internal threads of a smaller diameter $d_2$. The threaded portion 14a of bore 14 is formed midway of the bore, so as to define bore sections 14b, 14c on the opposite sides of the threaded section 14a and of a larger diameter ($d_1$) than the threaded section 14a and ($d_2$).

Bores 12 and 13, formed in the other two lens holders 2, 3, respectively, are also formed with a threaded section 12a, 13a of a diameter $d_2$, and with unthreaded sections 12b, 12c; 13b, 13c on opposite sides and of larger diameter $d_1$. Bore 11 formed in the retainer ring 10 at the outer face of the assembly has a transverse dimension (i.e., its diameter), which is at least as large as the larger transverse dimension (i.e., diameter $d_1$) of the bores 12, 13, 14 in the described embodiment. Bore 11 in the housing is of the larger diameter $d_1$ of bores 12–14, i.e. of the diameter of their section 12b, 12c, 13b, 13c; and 14 b, 14c.

The adjusting implement 20 may be used for individually adjusting each of the lens holders 2, 3, 4. It includes an elongated shank 21 formed at its outer tip with an externally-threaded section 22. The outer diameter of its externally-threaded section 22 is equal to the diameter $d_2$ of the internally-threaded sections (e.g. 14a) of the throughgoing bores 12, 13, 14 in the lens holders 2, 3, 4, so as to be threadedly received within these internally-threaded sections of the lens holder bores. The remainder of shank 21 of the adjusting implement 20 is of smaller diameter than $d_2$ so as to freely pass through the bores 12, 13, 14, of the lens holders, except that the opposite end of shank 21 is formed with a handle 24 of larger diameter, equal to diameter $d_1$ of bore 11 and the unthreaded sections of bores 12, 13 and 14.

The pitches of the internally-threaded sections 12a, 13a and 14a of bores 12, 13 and 14, may all be equal so that the same rotation of the adjusting implement 20 will effect the same displacement of the lens holders 2, 3, 4.

The adjusting implement 20 further includes an outer sleeve 26 slidably received over the handle 24 of shank 21, and a locking screw 28 for locking sleeve 26 in position on the end of the handle. In use as will be described below, the sleeve 26 is gripped with one hand, and the end of handle 24 is gripped with the other hand, for manipulating the adjusting implement. The outer surfaces of these gripped portions may therefore be knurled, 24', 26', respectively.

The three lens holders 2, 3, 4 are locked in place within the inner housing 6 by locking screws 32, 33, 34, respectively passing through openings in the inner housing 6 so as to be engagable with the outer face of the respective lens holders 2, 3, 4 for locking them in place. The outer surfaces of the lens holders engagable by the locking screws 32, 33, 34, are formed with slots, 42, 43, 44, respectively, having a width substantially the same as the outer diameter of the respective locking screws 32, 33, 34. Thus, the locking screws also serve the function of constraining the movement of the respective lens holders 2, 3, 4 to linear movements, toward or away from the outer face of the assembly occupied by the retainer ring 10, and prevent rotary movements of the lens holders.

The outer housing 8 of the assembly is formed with a bore of the same diameter as the outer diameter of the inner housing 6. Housing 8 is formed with three further bores 52, 53, 54, aligned with the locking screws 32, 33, 34 in the inner housing 6, to provide access to the locking screws.

The assembly illustrated in the drawings may be adjusted as follows:

First, the lens holders 3, 4, 2, in that order, are inserted from the outer face end 6a of the inner housing 6 to their approximate positions. The proximal lens holder 2 is thus closest to the outer face 6a of the inner housing 6 through which the adjustments are to be made, and the distal lens hoIdler 3 is remote from this outer face. The locking screws 32, 33, 34 are then tightened to temporarily lock each lens holder in its approximate position within the assembly.

The adjusting implement 20 is then inserted through bore 11 of the retainer ring 10 until its externally-threaded end section 22 is received within the internally-threaded section 12a of bore 12 in the proximal lens holder 2. Shank 21 of the adjusting implement 20 is then rotated via its handle 24 to advance the shank through the threaded section 12a of bore 12. As soon as threaded section 22 of shank 21 has traversed section 12a of the bore, the shank may be advanced forwardly until its threaded section 22 engages the internally-threaded section 14a of bore 14 in the intermediate lens holder 4. Shank 21 of the adjusting implement 20 is then again rotated to clear that bore section and is further advanced until its threaded section 22 engages the threaded section 13a in bore 13 of the distal lens holder 3.

Sleeve 26 of the adjusting implement 20 is then moved forwardly along shank 21 until the end of the sleeve abuts against the outer face of the retainer ring 10. Locking screw 28 is then tightened to lock the sleeve on the end of the shank. In addition, locking screw 33 cooperable with lens holder 3 is loosened, thereby permitting the lens holder to move axially.

The adjusting implement 20 is then rotated while the end of sleeve 26 is retained pressed against the outer face of retainer ring 10 so that the shank 21 of the adjusting implement does not move axially, thereby forcing the lens holder 3 to move axially to its precise position, at which it is locked by retightening its locking screw 33. The direction of rotation of adjusting implement 20 determines the direction of axial movement of lens holder 3.

After lens holder 3 has been precisely adjusted and locked in position, the adjusting implement 20 is withdrawn until its threaded section 22 is received within the threaded section 14a in bore 14 of lens holder 4. Sleeve 26 at the end of the adjusting implement 20 is again moved to abut against the end face of retainer ring 10 and locked in position by screw 28, and locking screw 34 of lens holder 4 is loosened. The adjusting implement may then be rotated in either direction to axially move lens holder 4 to its precise position, at which time its locking screw 34 is tightened to lock the lens holder in proper position.

The adjusting implement 20 is then further withdrawn until its threaded section 22 engages the threaded section 12a of bore 12 in lens holder 2, at which time locking screw 28 is tightened, locking screw 32 is loosened, the adjusting implement 20 is rotated to properly position lens holder 2, and then locking screw 32 is tightened to lock the lens holder in position.

While the invention has been described with respect to one preferred embodiment, it will be appreciated that many variations and other applications of the invention may be made. For example, the arrangement described may be used for adjusting only two lens holders, or more than three lens holders, within a common assembly. Instead of openings 11, 12, 13 and 14 being in the form of throughgoing bores, they could be open-ended slots having internally threaded sections. Instead of adjusting lens holders in a lens assembly, the invention could also be used in adjusting other elements to be precisely positioned in alignment with each other, such as electrodes in an electrode assembly. In addition, the lens holders (or other elements) may be adjusted by a motor-driven adjusting implement, corresponding to implement 20, rather than a manually-driven implement.

Many other variations, modifications and applications of the invention will be apparent.

What is claimed is:

1. An assembly of a plurality of at least two linearly-arranged elements, comprising:
    a housing formed with a cavity for slidably receiving said elements in alignment with each other, with one of said elements being proximal and the other distal with respect to an outer face of said housing;
    said proximal element being formed with a throughgoing opening of a first transverse dimension having internal threads at a portion thereof of a second transverse dimension smaller than that of said first transverse dimension;
    said distal element being formed with an opening having internal threads of a transverse dimension equal to that of said second transverse dimension in alignment with said throughgoing opening of said proximal element;
    said outer face of the housing being formed with an opening in alignment with said openings of the proximal and distal elements and having a transverse dimension at least as large as that of said first dimension to permit an adjusting implement formed with external threads to be inserted via said aligned openings in the housing, proximal element and distal element to precisely adjust said proximal and distal elements with respect to each other and with respect to the outer face of the housing by engaging the external threads of the adjusting implement first with the internal threads of said distal element and then with those of said proximal element.

2. The assembly according to claim 1, wherein said assembly includes at least one intermediate element between said proximal and distal elements and in alignment therewith; each of said intermediate elements being formed with a throughgoing opening in alignment with those of the proximal and distal elements and having a transverse dimension at least equal to that of said first transverse dimension and internal threads having a transverse dimension equal to that of said second transverse dimension to permit its adjustment by said adjusting implement after adjustment of the distal element and before adjustment of the proximal element.

3. The assembly according to claim 1, wherein said openings in the housing and in the plurality of elements are throughgoing bores of circular cross-section, each bore in each of said plurality of elements having a first section of one diameter constituting said first transverse dimension, and a second section of a second diameter, constituting said second transverse dimension.

4. The assembly according to claim 3, wherein said internal threads of the plurality of elements are formed midway of their respective bores.

5. The assembly according to claim 1, wherein said plurality of elements are lens holders each holding a lens to be precisely positioned within said housing.

6. The assembly according to claim 1, further including locking means comprising a locking screw for each of said elements threaded into said housing and engagable with a surface of the respective element.

7. The assembly according to claim 6, wherein said engaged surface of the respective element is formed with a slot of a width substantially equal to the diameter of the locking screw of the respective element, to thereby constrain movements of the respective element only to linear movements toward or away from said outer face of the housing.

8. The asembly according to claim 7, wherein said housing is an inner housing, said assembly including an outer housing formed with access means aligned with said locking screws to provide access thereto.

9. The assembly according to claim 8, wherein said access means comprises an opening for the locking screw of each of said elements.

10. The assembly according to claim 1, further including an adjusting implement formed with external threads insertable via said aligned openings in the housing for adjusting said plurality of elements one after the other starting from said distal element.

11. The assembly according to claim 10, wherein said adjusting element comprises an elongated shank formed with said external threads at one end thereof, the remainder of said shank insertable through said aligned openings having an outer diameter smaller than the outer diameter of said external threads.

12. The assembly according to claim 11, wherein said shank of the adjusting implement further includes a handle at the end thereof opposite to that of said threaded end, and of an outer diameter larger than that of said remainder portion of the shank.

13. The assembly according to claim 12, wherein said adjusting implement further includes an outer sleeve slidably receivable over said handle.

14. The assembly according to claim 13, wherein said outer sleeve includes a locking screw for locking the sleeve in a desired position on said handle end of the shank.

15. An assembly of a plurality of at least two linearly-arranged lens holders, comprising:
    a housing formed with a cavity for slidably receiving said lens holders in alignment with each other, with one of said lens holders being proximal and the other distal with respect to an outer face of said housing;
    said proximal lens holder being formed with a bore of a first diameter having internal threads at a portion thereof of a second diameter smaller than that of said first diameter;
    said distal lens holder being formed with a bore having internal threads of a diameter equal to that of said second diameter in alignment with said bore of said proximal lens holder;
    said outer face of the housing being formed with a bore in alignment with said bore of the proximal and distal lens holders and having a diameter at least as large as that of said first diameter to permit an adjusting implement formed with external threads to be inserted via said aligned bores in the housing, proximal lens holder and distal lens holder to precisely adjust said proximal and distal lens holder with respect to each other and with respect to the outer face of the housing by engaging the external threads of the adjusting implement first with the internal threads of said distal lens holder and then with those of said proximal lens holder.

16. The assembly according to claim 15, wherein said assembly includes at least one intermediate lens holder between said proximal and distal lens holder and in alignment therewith; each of said intermediate lens holders being formed with a bore in alignment with those of the proximal and distal lens holders and having a diameter at least equal to that of said first diameter and internal threads having a diameter equal to that of said second diameter to permit adjustment of said intermediate lens holder by said adjusting implement after adjustment of the distal lens holder and before adjustment of the proximal lens holder.

17. The assembly according to claim 15, wherein said internal threads of the plurality of lens holders are formed midway of their respective bores.

18. The assembly according to claim 15, further including locking means comprising a locking screw for each of said lens holders threaded into said housing and engagable with a surface of the respective lens holder.

19. The assembly according to claim 18, wherein said engaged surface of the respective lens holder is formed with a slot of a width substantially equal to the diameter of the locking screw of the respective lens holder, to thereby constrain movements of the respective lens holder only to linear movements toward or away from said outer face of the housing.

20. The assembly according to claim 18, wherein said housing is an inner housing, and said assembly further includes an outer housing formed with a bore aligned with each of said locking screws to provide access thereto.

* * * * *